US006966061B1

(12) United States Patent  
Vance et al.

(10) Patent No.: US 6,966,061 B1  
(45) Date of Patent: Nov. 15, 2005

(54) SYSTEM AND METHOD FOR MANAGING INITIATIVE DELIVERY PROCESS

(75) Inventors: Charles H. Vance, Marietta, GA (US); Laurie Dean, Dunwoody, GA (US); Lee Bullard, Atlanta, GA (US)

(73) Assignee: BellSouth Intellectual Property Corp., Wilmington, DE (US)

( * ) Notice: Subject to any disclaimer, the term of this patent is extended or adjusted under 35 U.S.C. 154(b) by 842 days.

(21) Appl. No.: 09/892,468

(22) Filed: Sep. 20, 2001

(51) Int. Cl.[7] ............................................... G06F 9/46
(52) U.S. Cl. ............................ 718/100; 705/8; 705/9; 707/10; 707/100
(58) Field of Search ............... 718/100–108; 705/8–9; 707/10, 100

(56) References Cited

U.S. PATENT DOCUMENTS

| | | | | |
|---|---|---|---|---|
| 5,321,610 A | * | 6/1994 | Breslin | 705/9 |
| 5,548,506 A | * | 8/1996 | Srinivasan | 705/8 |
| 6,529,911 B1 | * | 3/2003 | Mielenhausen | 707/100 |
| 6,571,215 B1 | * | 5/2003 | Mahapatro | 705/8 |
| 6,578,006 B1 | * | 6/2003 | Saito et al. | 705/9 |
| 6,889,196 B1 | * | 5/2005 | Clark | 705/9 |

OTHER PUBLICATIONS

Tim Pyron, "Using Microsoft Project 98", 1997, Que, Special Edition, pp. 201-203, 209, 406, 450, 748, 800-801, 902, 943.*

* cited by examiner

*Primary Examiner*—Meng-Al T. An
*Assistant Examiner*—Jennifer N. To
(74) *Attorney, Agent, or Firm*—Withers & Keys, LLC (57) ABSTRACT

A program initiative management tool provides managers with a view of program initiative status by task (phase). Program initiatives are listed in order of priority. Target completion dates and actual completion dates are entered for each task using different text formats and/or colors, or other visual cues to indicate whether the entry is an actual date or a target completion date. In addition, jeopardies are illustrated in the program initiative management tool when resources or required inputs are not available to complete a particular task by its target completion date. A program initiative delivery process document includes all activities that can be performed to complete tasks in a program initiative. The program initiative delivery process document provides a template for program initiative development. A relational database stores descriptions of activities, resources and input/output flags required to complete tasks. The relational database also stores the relationships between the activities, resources and input/output flags.

28 Claims, 6 Drawing Sheets

| | | | | | Task 1 | | | | | Task 2 | | | Task 3 | | Task 4 | | | |
|---|---|---|---|---|---|---|---|---|---|---|---|---|---|---|---|---|---|---|
| | | | | | Subtask 1a | Subtask 1b | Subtask 1c | Subtask 1d | Subtask 1e | Subtask 2a | Subtask 2b | Subtask 2c | Subtask 3a | Subtask 3b | Subtask 4a | Subtask 4b | Subtask 4c | Subtask 4d |
| | | | | | 1 | 2 | 3 | 4 | 5 | 1 | 2 | 3 | 1 | 2 | 1 | 2 | 3 | 4 |
| Initiative # | Initiative Name | Owner | Project Manager | Target Completion Date (TCD) | | | | | | | | | | | | | | |
| 1 | Name/Description 1 | Owner 1 | PM 1 | 5/10/02 | 4/10/01 | | | | | 6/22/01 | | | n/a | | 0/0/0 | | | |
| 2 | Name/Description 2 | Owner 2 | PM 2 | 3/1/00 | 5/23/99 | | | | | 3/22/00 | | | n/a | | 8/20/00 | | | |
| 3 | Name/Description 3 | Owner 3 | PM 3 | 12/3/03 | 10/2/01 | | | | | 7/1/02 | | | 5/5/03 | | 12/03/03 | | | |
| 4 | Name/Description 4 | Owner 4 | PM 4 | 10/1/01 | 10/20/00 | | | | | 2 - R | | | 7/3/01 | | 10/1/01 | | | |
| 5 | Name/Description 5 | Owner 5 | PM 5 | 6/3/02 | 1/10/01 | | | | | 9/22/01 | | | 4/23/02 | | 6/3/02 | | | |
| 6 | Name/Description 6 | Owner 6 | PM 6 | 2/5/00 | 2/10/99 | | | | | 8/2/99 | | | n/a | | 2/5/00 | | | |
| 7 | Name/Description 7 | Owner 7 | PM 7 | TBD | 0/0/0 | | | | | 0/0/0 | | | 0/0/0 | | 0/0/0 | | | |
| 8 | Name/Description 8 | Owner 8 | PM 8 | 8/2/01 | 2/3/00 | | | | | 6/4/00 | | | 1/10/01 | | 5/3/01 | | | |
| 9 | Name/Description 9 | Owner 9 | PM 9 | 2/9/01 | 12/10/99 | | | | | 7/10/00 | | | 0/0/0 | | 2/9/01 | | | |
| 10 | Name/Description 10 | Owner 10 | PM 10 | TBD | 2/5/01 | | | | | 7/20/01 | | | 9/21/01 | | 0/0/0 | | | |

LEGEND

101

| Initiative # | Initiative Name | Owner | Project Manager | Target Completion Date (TCD) |
|---|---|---|---|---|
| 1 | Name/Description 1 | Owner 1 | PM 1 | 5/10/02 |
| 2 | Name/Description 2 | Owner 2 | PM 2 | 3/1/00 |
| 3 | Name/Description 3 | Owner 3 | PM 3 | 12/3/03 |
| 4 | Name/Description 4 | Owner 4 | PM 4 | 10/1/01 |
| 5 | Name/Description 5 | Owner 5 | PM 5 | 6/3/02 |
| 6 | Name/Description 6 | Owner 6 | PM 6 | 2/5/00 |
| 7 | Name/Description 7 | Owner 7 | PM 7 | TBD |
| 8 | Name/Description 8 | Owner 8 | PM 8 | 8/2/01 |
| 9 | Name/Description 9 | Owner 9 | PM 9 | 2/9/01 |
| 10 | Name/Description 10 | Owner 10 | PM 10 | TBD |

LEGEND

| | Task 1 | | | | | Task 2 | | | Task 3 | | Task 4 | | | |
|---|---|---|---|---|---|---|---|---|---|---|---|---|---|---|
| | Subtask 1a | Subtask 1b | Subtask 1c | Subtask 1d | Subtask 1e | Subtask 2a | Subtask 2b | Subtask 2c | Subtask 3a | Subtask 3b | Subtask 4a | Subtask 4b | Subtask 4c | Subtask 4d |
| | 1 | 2 | 3 | 4 | 5 | 1 | 2 | 3 | 1 | 2 | 1 | 2 | 3 | 4 |
| | 4/10/01 | | | | | 6/22/01 | | | | | | | | |
| | 5/23/99 | | | | | 3/22/00 | | | | | | 8/20/00 | | |
| | 10/2/01 | | | | | 7/1/02 | | | 5/5/03 | | | 12/03/03 | | |
| | 10/20/00 | | | | | 2 - R | | | 7/3/01 | | | 10/1/01 | | |
| | 1/10/01 | | | | | 9/22/01 | | | 4/23/02 | n/a | | 6/3/02 | | |
| | 2/10/99 | | | | | 8/2/99 | | | n/a | | | 2/5/00 | | |
| | 0/0/0 | | | | | 0/0/0 | | | 0/0/0 | | | 0/0/0 | | |
| | 2/3/00 | | | | | 6/4/00 | | | 1/10/01 | | | 5/3/01 | | |
| | 12/10/99 | | | | | 7/10/00 | | | 0/0/0 | | | 2/9/01 | | |
| | 2/5/01 | | | | | 7/20/01 | | | 9/21/01 | | | 0/0/0 | | |

| Information Technology Unit | Business information unit | Customer responsibilities unit | | | | |
|---|---|---|---|---|---|---|
| QA/IL engineer | Business analyst | | | | | |
| | | | | Activity 3<br>Brief description<br>Business analyst | | |
| | | Network engineer | | | | Activity 4<br>Brief description<br>Network engineer |
| | | Initiative owner | Activity 1<br>Brief description<br>Initiative owner | | | Serves as resource for the activities listed in this column |
| | | End-to-end project manager | | Activity 2<br>Brief description<br>Project Manager | | |

SYSTEM AND METHOD FOR MANAGING INITIATIVE DELIVERY PROCESS

BACKGROUND

1. Field of the Invention

The present invention relates generally to managing delivery of program initiatives. More specifically, the present invention is related to program management software that shows program initiative status and jeopardies in a convenient easy-to-understand manner.

2. Background of the Invention

Program management of large program initiatives is a complex, time-consuming task in which large amounts of information must be integrated and presented to decision makers such as program managers. Presenting this information in a convenient manner is a difficult proposition. Generally, program initiatives are broken up into identifiable tasks (or phases) to be performed to complete the program initiative. Each of these tasks is conventionally assigned a completion date and resources required to complete the task.

A significant program management problem where there are a plurality of on-going program initiatives is assigning resources among the program initiatives in an efficient and consistent manner, and ensuring required inputs are available so that the tasks for each project can be completed by a target completion date. It is often the case however, that there are insufficient resources to assign, or required inputs are not available when required. Consequently, programs are delayed.

To assist program managers in tracking the progress of program initiatives, numerous program management software products have been developed. These products allow program management techniques such as creating timelines that show when tasks expected to begin and end, actual task completion dates, and project and task manager identities. However, they often present this data for only one project at a time. Moreover, the data is often not intuitively presented, which makes it difficult for managers and other decision makers to quickly assess the data so they can make decisions proactively, rather than reactively. That is, conventional software makes it difficult to see prospectively, where problems are likely to occur, and managers must often react to fix problems after they occur rather than reallocate resources, or take other action, to prevent problems from occurring.

Consequently, conventional program management software does not achieve the goal of presenting the vast amounts of information available to it in a convenient easy-to-use format that provides crucial information to decision makers so that they can make informed decisions as to how to allocate scarce resources and expertise to complete program initiatives in a timely manner.

SUMMARY OF THE INVENTION

The present invention solves the foregoing problems associated with conventional program management systems by providing a system and method for managing program initiatives in an efficient cost-effective manner. In one embodiment, the present invention is a system for managing a plurality of program initiatives. The system includes a program initiative management tool. The program initiating management tool is preferably derived from software executing on a computer, such as a personal computer. The program initiative management tool displays or prints a list of the plurality of program initiatives. For each of the program initiatives there is identification information related to the program initiatives. The identification information includes such information as a program initiative descriptive name, program initiative generator, project manager and target completion date for the entire program initiative. In addition, a list of tasks that can be performed for each program initiative is associated with each program initiative listed. A target completion date is shown for each task to be performed for each of the program initiatives listed. Target completion dates are entered in a manner to indicate status of the task. For example, the status can be that the task is not yet started or the task is completed. On occasion problems will arise in completing tasks. For example, a necessary input or resource required to complete a task is not available. In this case, a jeopardy is entered to indicate the problem status of the task.

In one embodiment of the present invention, target completion dates indicate status using different colors and/or text formats. A legend is provided to describe how the target completion dates and jeopardies are being presented to indicate status.

The system also includes a program initiative delivery process document. The program initiative delivery process document includes a list of business functionalities entered in a differentiated manner. For example, the business functionalities can be differentiated using color or text formatting. The program initiative delivery process document also includes a list of activities corresponding to the business functionalities. These activities correspond to tasks and/or subtasks listed on the program initiative management tool. In addition, the program initiative delivery process document provides an indication of business functionalities that are used as resources for activities.

The program initiative delivery process document provides a template for program initiative development. Because the program initiative delivery process document contains all of the activities that can be engaged by any particular program initiative, a program initiative developer can use the program initiative delivery process document to ensure that he or she has included all required activities, that is tasks and subtasks, by looking at the program initiative delivery process document.

The system also includes a relational database for storing information related to activities, resources and flags that describe the entries in the program initiative delivery process document. For example, the relational database can be a web server having a web browser graphical user interface front end for accessing the information stored in the database. If a user desires additional information about a particular activity listed on the program initiative delivery document, the user can find that information using the relational database.

Another embodiment of the present invention is a method for managing a plurality of program initiatives in an efficient cost-effective manner. The method includes the step of listing the plurality of program initiatives in priority order along with identification information related to the program initiatives. In addition, the tasks that are required to complete any program initiative are listed. The method also includes the step of entering a target completion date for each task to be performed in each program initiative in a manner to indicate a status of the corresponding task. The method also includes the step of entering a jeopardy for each task for which a resource or input is not available when required.

Using the present invention, decision makers, such as program managers, can make proactive program initiative decisions, such as resource allocation and program initiative priority. Because problems can be seen and resolved before they occur, the present invention provides a more robust system and method for managing program initiatives than conventional systems. Consequently, using the program initiative management system of the present invention will likely result in timely, cost-effective completion of program initiatives.

The present invention is described in greater detail in the detailed description of the invention, the appended drawings and the attached claims.

DETAILED DESCRIPTION OF THE INVENTION

Figure 1:
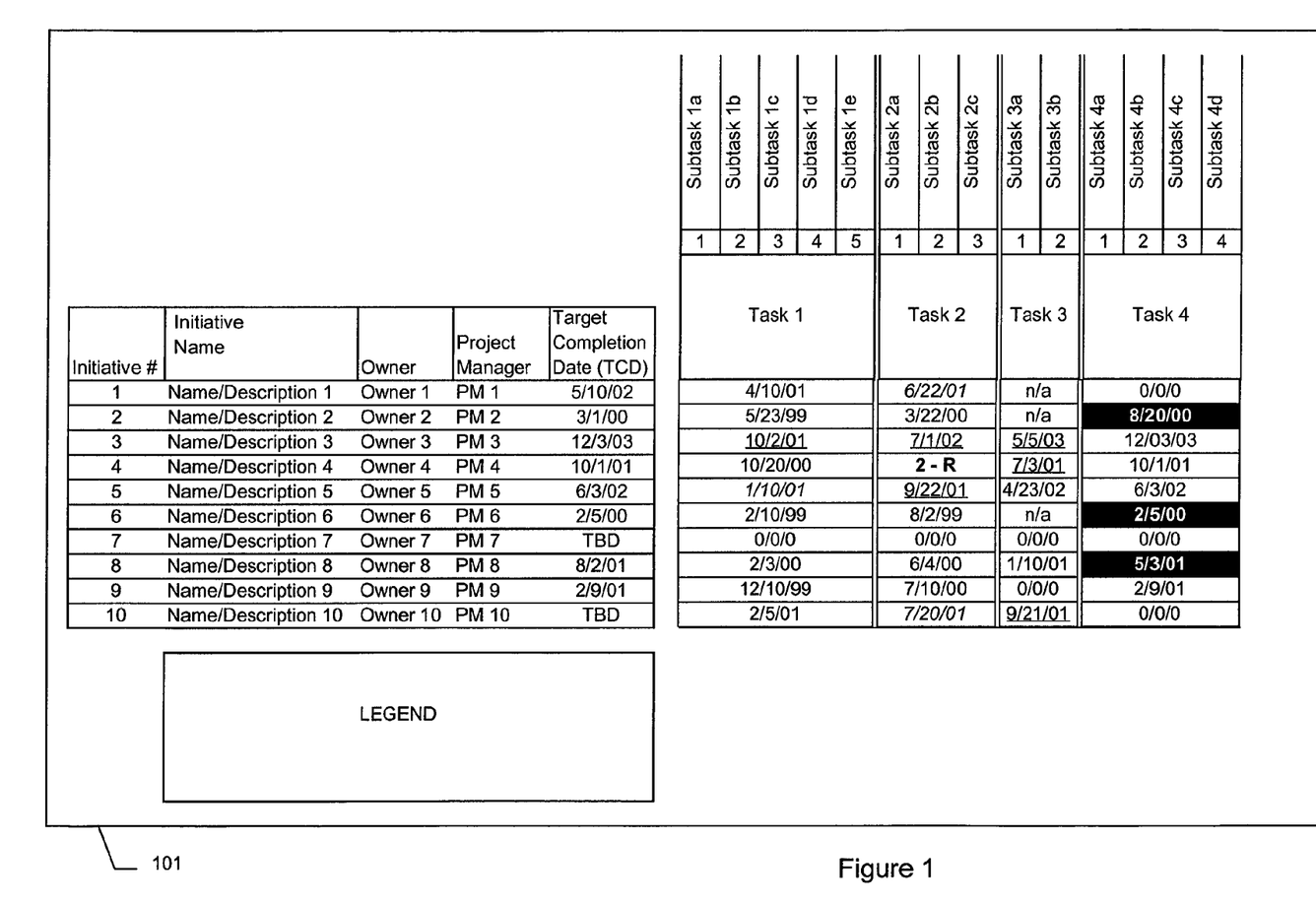
FIG. 1 is a diagram of an exemplary program initiative management tool according to the present invention.

FIG. 1 is a diagram of an exemplary program initiative management tool 101 according to the present invention. In the embodiment illustrated in FIG. 1, the program initiative management tool is a spreadsheet showing 10 program initiatives. For each initiative, program initiative management tool 101 lists a name or brief description of the program initiative, the owner of the program initiative (e.g., which person or entity generated the program initiative), the program initiative project manager and the target completion date (TCD) of the program initiative.

The program initiative management tool of the present invention is preferably implemented using a spreadsheet or other software for creating reports. The software executes on any computer, for example a personal computer. Such computers are well known to those having skill in the art and need not be described further for a complete understanding of the present invention.

Preferably, the program initiatives are listed in order of priority. This priority is generally determined by a committee, such as a priority review board, that determines the relative priorities of all program initiatives. Preferably, only the top N program initiatives are displayed by the program initiative management tool of the present invention. For example, while there may be many program initiatives, only the top 10 program initiatives are displayed by program initiative management tool 101 of FIG. 1.

Each program initiative is broken into a series of tasks that are to be performed. Tasks can also be referred to as phases. Each of the tasks is further broken up into a series of subtasks that are to be performed to complete the particular task. All tasks and subtasks to be performed for each program initiative are predefined in a program initiative delivery process document (described below).

Management data is entered into the program initiative management tool of the present invention. The management data can be entered automatically or manually. For manual operation, an operator enters the management data based on information provided by a project manager or other person responsible for providing the management data. Preferably, at the end of each subtask, the status of each subtask is determined against a list of milestones (described below). If all of the milestones are not completed, the associated risks are identified. If necessary, jeopardies are entered in the program initiative management tool as required.

The management data can be determined automatically using a tracking algorithm that determines the appropriate data to enter based on the current state of resources that are required to complete a particular task. The tracking algorithm can be executed as often as deemed appropriate, for example, at the end of each day or the end of each subtask.

In one implementation, the tracking algorithm determines whether a particular resource or input is available when required. This information is determined based on resource scheduling information available to the algorithm. For example, the tracking algorithm can track when resources are available using data input by the business unit or functionality responsible for the resource. When the resource completes a particular task or subtask, a flag is reset indicating the resource is free. Likewise, when the resource is in use the flag is set. In addition, the expected time the resource will be used or available is stored. The tracking algorithm determines the availability by checking the status and the time the resource is in a particular state, i.e., either available or in use. The tracking algorithm updates the management data displayed in the program initiative management tool based upon its determinations regarding resource status.

Management data comprises dates of expected completion of a particular task as well as an indication of any jeopardies that are present. Jeopardies result when there are insufficient resources to complete a task or inputs required to complete a task are unavailable. Preferably, the management data is entered into the program initiative management tool of the present invention in a differentiated manner to indicate status. That is, the management data is presented in the program initiative management tool of the present invention to indicate the status of the task, for example, whether the task is in progress, complete, not required for the particular program initiative or not in progress.

Figure 2:
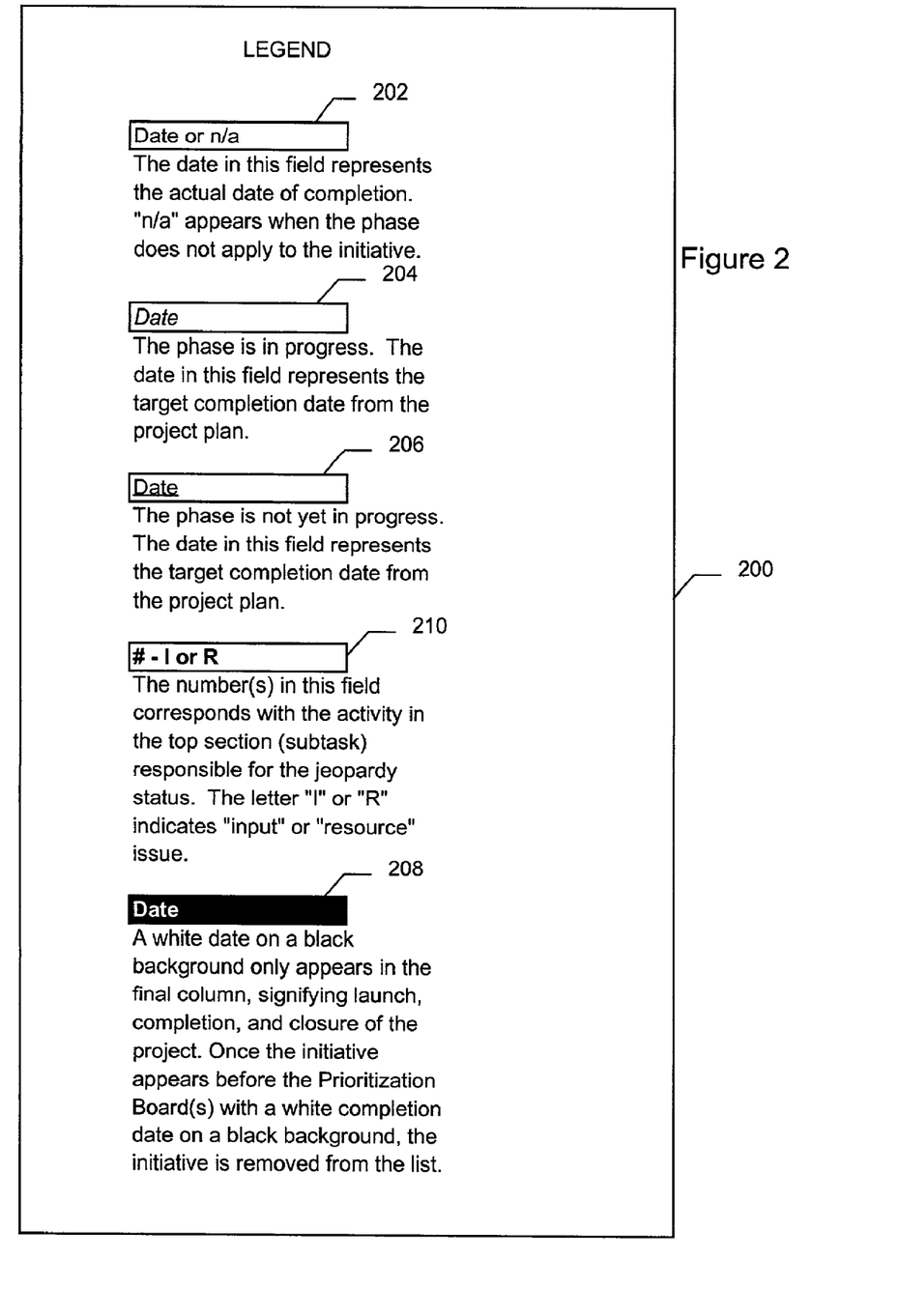
FIG. 2 is an exemplary legend describing how target completion dates and jeopardies are entered into a program initiative management tool of the present invention.

Preferably, a legend is included to provide a user of program initiative management tool 101 with an indication of how the management data is being presented to indicate status. An exemplary legend 200 is illustrated in FIG. 2. Dates written in normal typeface 202 indicate the actual date that a task has been completed. An "n/a" or a date of "00/00/0000" indicates that the task is not required for a particular program initiative. An italicized date 204 indicates that the task is in progress. An underlined date 206 indicates that the task is not yet in progress. Italicized dates 204 and underlined dates 206 indicate target completion dates for the task. These dates are typically derived from the project plan for the program initiative. A white date on a black background 208 signifies completion of the program initiative. This is the date that the program initiative is closed after completion and launch. The program initiative is removed from the program initiative management tool after it appears before a program initiative prioritization board as a completed program initiative. It would be apparent to those skilled in the art that any markings, for example, different colors and/or text formatting, or other visual cues can be used to show different statuses.

Jeopardies are indicated by a number followed by an "I" or a "R," such as illustrated by item 210 in legend 200. For further emphasis, jeopardies 210 appear in bold typeface. The number indicates the subtask of task responsible for the jeopardy. An "I" indicates that a required input is unavailable. For example, if an input from a technical expert is required to complete a particular subtask, but that technical expert cannot provide the input for some reason, then the status of the task is the number associated with the subtask of the technical expert followed by the letter "I." An "R" indicates that required resources are not available to perform the subtask. For example, if a piece of equipment is required to complete a particular subtask, but that equipment is unavailable, then the status of the task is the number associated with the subtask for which the equipment is required followed by the letter "R."

By showing the statuses of the series of tasks required to complete each program initiative as compared with other program initiatives managers or executives are able to see where problems currently exist, and where they might occur. Thus, the program initiative management tool of the present invention allows decision makers to prospectively determine where problems are likely to arise in the lifecycle of program initiatives. Moreover, the presentation with different text formats and/or colors makes these relationships comprehensible virtually at a glance.

For example, FIG. 1 shows a jeopardy in subtask 2a of program initiative 4 because a resource is not available. This is indicated by the "2-R" appearing in the task 2 column for program initiative 4. Action can be taken given this information. For example, by reviewing program initiative management tool 101 of FIG. 1, it is easily seen that resources have been expended to start task 2 for program initiative 10. However, program initiative 10 has a lower priority than program initiative 4 (due to its lower position in the chart). Consequently, those resources currently allocated to task 2 for program initiative 10 can be reallocated to perform task 2 for program initiative 4. Alternately, additional resources can be procured to perform task 2 for program initiative 4.

Thus, the program initiative management tool of the present invention allows decision makers to see virtually immediately, where problems in completing program initiatives lie. This allows decision makers to make prospective decisions on how to allocate and reallocate resources to ensure efficient completion of program initiatives.

In addition, the program initiative management tool of the present invention provides a view of the top N program initiatives (preferably arranged by priority), and their respective statuses as compared to one another. This offers advantages over conventional project management tools that only track the status of a single project. For example, managers can see where resources are allocated among the program initiatives and where inputs are required. Given this information, managers can take action where appropriate. Because the program initiative management tool of the present invention illustrates projected dates of completion for each task and where resources and inputs are in jeopardy, managers can take action proactively as well are reactively. That is, the program initiative management tool of the present invention provides managers with a view of program initiative statuses by which managers can see potential problems, such as resource usage conflicts, before they occur, as well as problems that have already occurred.

Additionally, the view allows the managers to make informed decisions when reallocating resources. For example, as noted above, program initiative 10 in FIG. 1 has resources currently allocated to task 2 that might be reallocated to a higher priority program initiative such as program initiative 4. If the target completion date for task 2 of initiative is relatively imminent, perhaps only a few days away, the managers may well decide to wait until its completion rather than immediately reallocating the resources. In this manner, program initiative 4 may only be delayed a short period, while program initiative 10 can continue without delay because there are no program initiative jeopardies shown for task 3 for program initiative 10.

The tasks for the program initiative management tool of the present invention are preferably pre-determined. These tasks are compiled in a program initiative delivery process document. The program initiative delivery process document comprises all of the tasks and corresponding subtasks that can be performed in a program initiative. Each subtask required for a particular task is performed for each task included in a program initiative. Thus, the program initiative delivery process document acts as a template for building a program initiative. The program initiative delivery process document shows all resources and inputs required to complete a particular task. Further, outputs that are produced upon completion of each task is shown.

Figure 3:
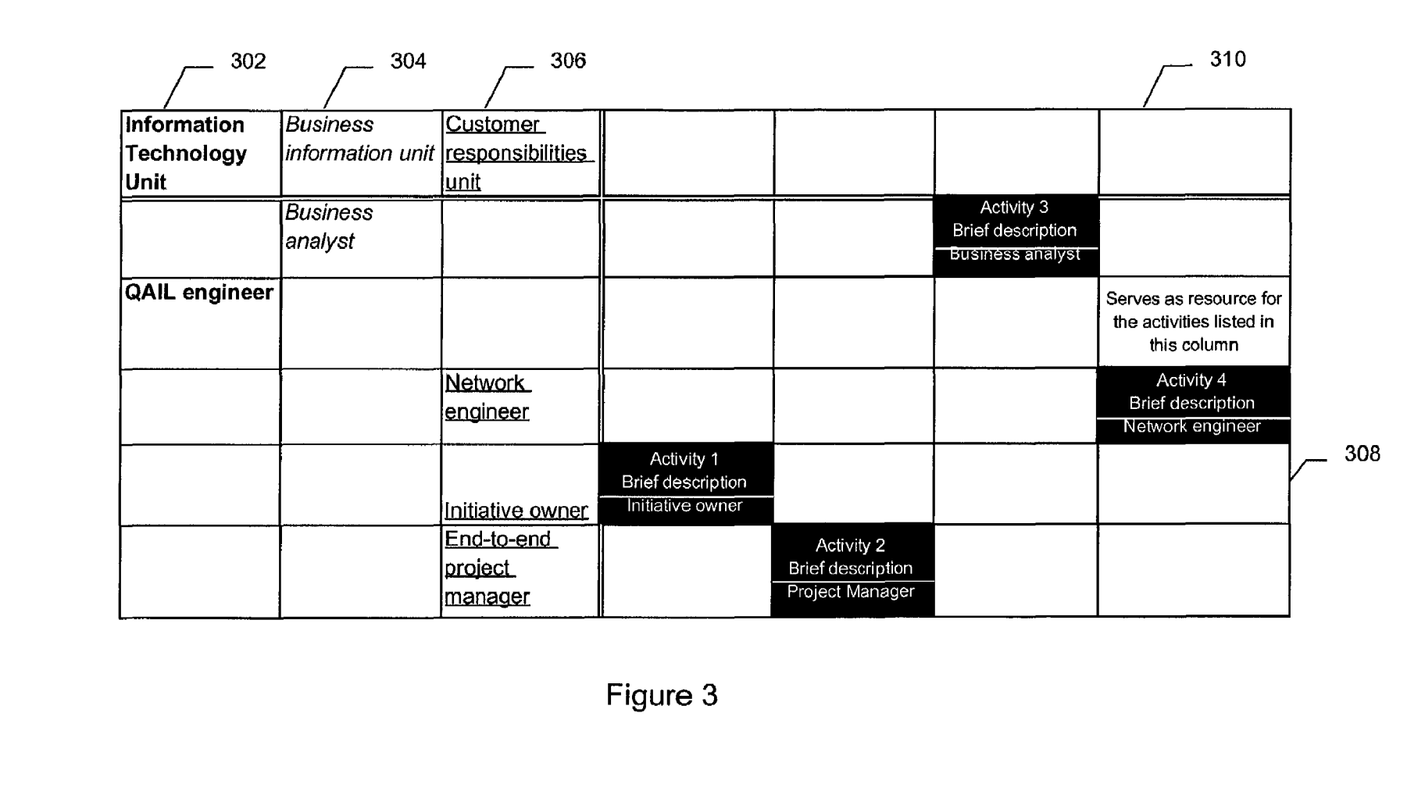
FIG. 3 is a diagram of an exemplary program initiative delivery process document according to the present invention.

FIG. 3 illustrates an exemplary program initiative delivery process document. The program initiative delivery process document of FIG. 3 is simplified for clarity of presentation. As can be seen the program initiative delivery process document lists specific functional units under their particular business functionalities. Functional units associated with the information technology unit appear in column 302. Functional units associated with the business information unit appear in column 304. Functional units associated with the customer responsibilities unit appear in column 306. The functional units are differentiated on the basis of color and/or text format. For example, the functional units corresponding to the information technology unit appear in boldface; the functional units corresponding to the business information unit appear italicized; and the functional units corresponding to the customer responsibilities units are underlined.

For example, in FIG. 3, functional units are illustrated for the business functionalities: information technology delivery units, business information units and customer responsibilities units. There is one functional unit per row. The information technology units can include an architect, such as a database architect, a billing consultants, a system analyst, a configuration management team, a developer, a prime integrator, a project team, a quality analyst, a quality assurance integration lab (QAIL) engineer, a technical lead and an interface designer. The business information units can include an operational excellence analyst, a reporting analyst and a business analyst. The customer responsibilities units can include a business development analyst, a document specialist, a network engineer, a financial analyst, a prioritization owner, an initiative owner, an initiative sponsor, legal support, a life-cycle manager, a process engineer, a process owner, an end-to-end project manager, a resource manager, a system administrator, a subject matter expert and a user group.

The activities for which each of the functional units is responsible is described in the row corresponding to the functional unit. For example, the initiative owner is responsible for the input for activity 1. Thus, activity 1 appears in row 308, which corresponds to activities performed by the initiative owner. A functional unit can be responsible for more than one activity. When a functional unit is responsible for more than one activity. In addition, more than one functional unit can be required for a particular activity. For example, an activity block can be repeated in a particular column corresponding to the row of the functional units that are responsible for it. In addition, a functional unit can act as a resource for activities performed by other functional units. For example, The QAIL engineer serves as a resource for the network engineer's completion of activity 4 as shown in column 310.

Required inputs are also shown in activity blocks. For example, the initiative owner is listed in the bottom of the block corresponding to activity 1 to indicate that the initiative owner must provide input to complete activity 1.

The program initiative delivery process document is typically designed by pre-determining all of the task and subtasks required for any program initiative, and the inputs and resources required to complete them. In addition, any outputs generated by the task or subtask are determined. The tasks, subtasks, inputs, outputs and resources are represented in the chart form of the exemplary program initiative delivery document illustrated in FIG. 3. Preferably, the activities are listed in the order (from left to right) that they would typically be performed to complete a program initiative.

Because it contains all activities that can be used by any program initiative in a orderly manner (i.e., in the order that the activities would typically be completed in a program initiative), the program initiative delivery document can function as a template for program initiative development. When a program initiative is generated, the program initiative delivery process document is consulted to determine which of the activities are required for the program initiative. The required activities are selected and assigned projected completion dates. This information is entered into the program initiative management tool of the present invention. Using the program initiative delivery document as a template decreases the risk that an activity is overlooked or otherwise missed when developing a program initiative.

The data entered in the program initiative delivery process document can be augmented by a relational database. The relational database may contain records for activities, resources required for those activities and flags describing the inputs and outputs associated with the activities. Using this database, a user of the program initiative delivery document can obtain more information about particular activities listed in the document or the program initiative management tool of the present invention.

Figure 4:
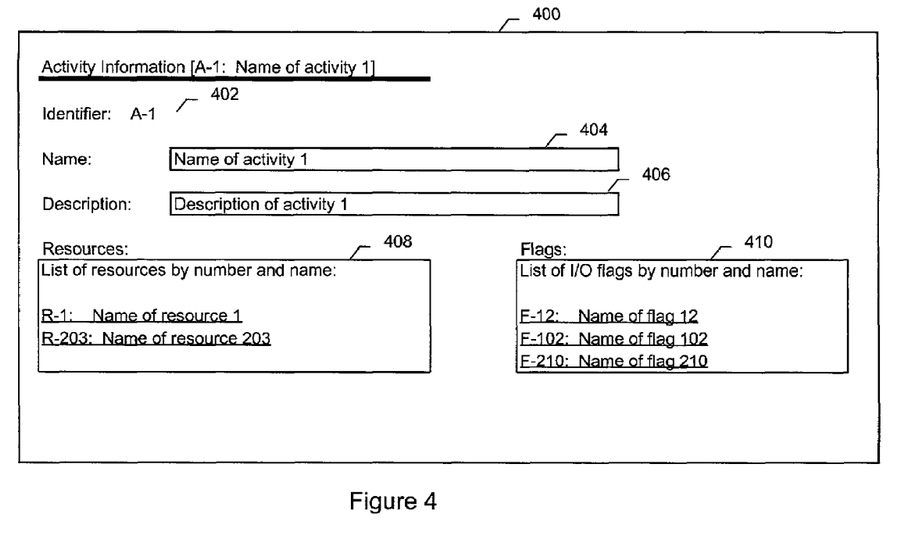
FIG. 4 is an illustration of the fields comprising an exemplary activity record according to the present invention.

FIG. 4 is an illustration of the fields comprising an exemplary activity record 400 according to the present invention. There is a record such as illustrated in FIG. 4 for each activity listed in the program initiative delivery process document. Each activity record 400 comprises the fields illustrated in FIG. 4. "Identifier" field 402 contains an alphanumeric identifier of the activity. Preferably, "Identifier" field 402 is a one-up counter for each activity. Activities are identified by an "Identifier" field beginning with "A." A "Name" field 404 contains the name of the activity as it will appear on the program initiative delivery process document. A "Description" field 406 contains a brief description of the activity for providing users with more information regarding the particular activity.

A "Resources" field 408 contains a list of resources associated with the activity. Resources include equipment and personnel required for a particular project. In one embodiment of the present invention, each resource is presented as an HTML hyperlink. Double clicking on the hyperlink pulls up a web page containing information associated with the resource as described below.

A "Flags" field 410 contains a list of flags associated with the activity. The flags correspond to inputs required for the activity and outputs produced by the activity. In one embodiment of the present invention, each flag is presented as an HTML hyperlink. Double clicking on the hyperlink pulls up a web page containing information associated with the flag as described below.

Figure 5:
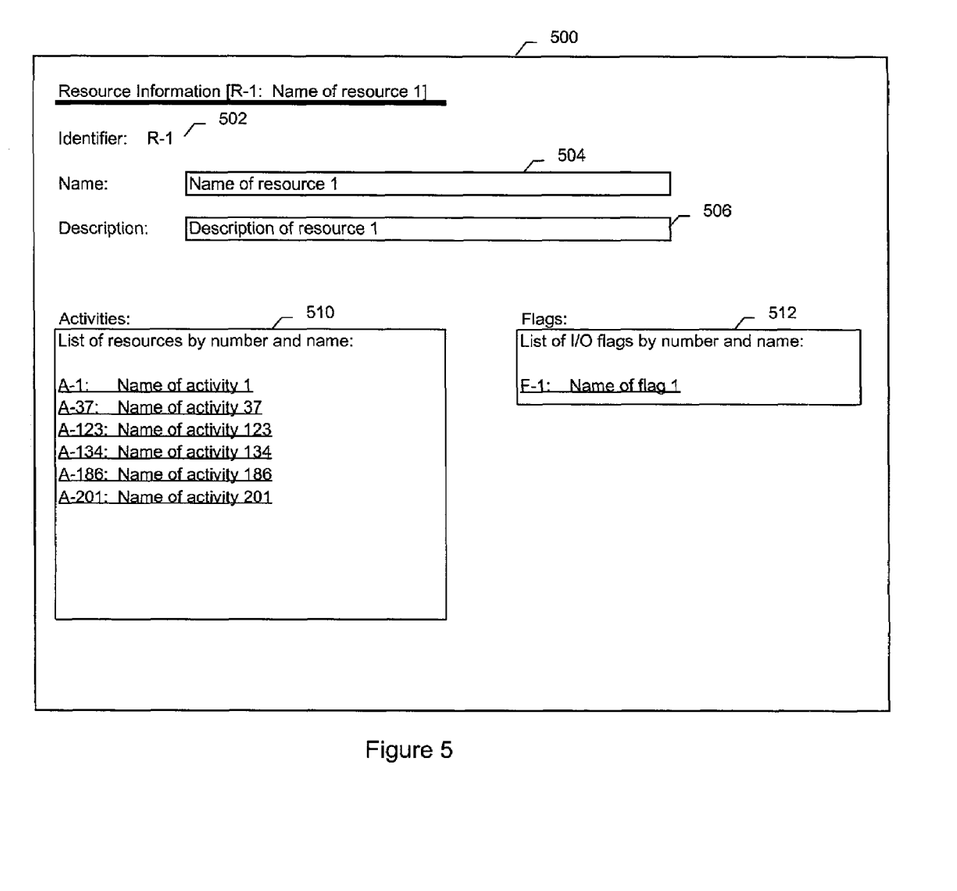
FIG. 5 is an illustration of the fields comprising an exemplary resource record according to the present invention.

FIG. 5 is an illustration of the fields comprising an exemplary resource record 500 according to the present invention. There is a record such as illustrated in FIG. 5 for each resource available to activities that are listed in the program initiative delivery process document. Each resource record may comprise the fields illustrated in FIG. 5. An "Identifier" field 502 contains an alphanumeric identifier of the resource. Preferably, "Identifier" field 502 is a one-up counter for each resource. Resources are identified by an "Identifier" field beginning with "R." A "Name" field 504 contains the name of the resource as it will appear on the program initiative delivery process document. A "Description" field 506 contains a brief description of the resource that provides a user with more information regarding the particular resource. An "Activities" field 510 contains a list of the activities for which the resource is required or to which the resource can be assigned. A "Flags" field 512 contains a list of flags corresponding to inputs required by the resource or outputs generated by the resource.

Figure 6:
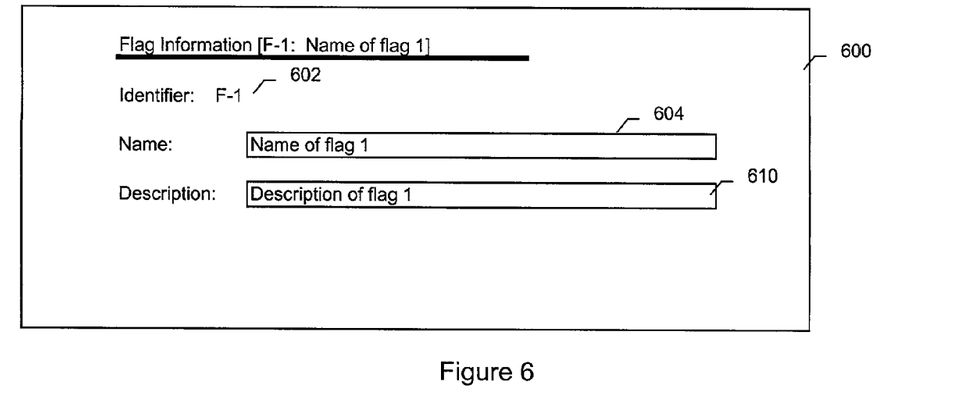
FIG. 6 is an illustration of the fields comprising an exemplary flag record according to the present invention.

FIG. 6 is an illustration of the fields comprising an exemplary flag record 600 according to the present invention. There is a record such as illustrated in FIG. 5 for each flag associated with any activity listed in the program initiative delivery process document, or any resource associated with such an activity. Each flag record comprises the fields illustrated in FIG. 6. A "Identifier" field 602 contains the alphanumeric identifier of the flag. Preferably, "Identifier" field 602 is a one-up counter for each flag. Flags are identified by an "Identifier" field beginning with "F." A "Name" field 604 contains the name of the flag as it will appear in the resource or activity records. A "Description" field 606 contains a brief description of the flag that provides a user with more information regarding the particular resource.

The relational database containing activities, resources and flags records can be implemented using web technology on a webserver. A web browser front-end executing on the web server presents web pages, preferably having a format similar to that shown in FIGS. 4, 5 and 6, provides a graphical user interface for accessing the information stored in the database of the web server. Each of the underlined items in FIGS. 4, 5 and 6 represents an HTML jump cite or HTML link to a web page that shows information related to that item. HTML links on the web pages allows the user to navigate through the web pages to find desired data. For example, a user can pull up information for a resource required for a particular activity by double clicking on the desired resource name in the resource field of the activity web page.

In one embodiment of the present invention, the relational database is linked to the program initiative process delivery document, for example, by HTML hyperlinks. In this embodiment, a user can obtain information from the relational database on an activity by double clicking on the activity block in the program initiative delivery process document. once the web page containing the requested activity information is displayed to the user via a web browser, the user can navigate through associated resource, flag and activity records as described above.

The foregoing disclosure of the preferred embodiments of the present invention has been presented for purposes of illustration and description. It is not intended to be exhaustive or to limit the invention to the precise forms disclosed. Many variations and modifications of the embodiments described herein will be obvious to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A system for managing a plurality of program initiatives, comprising:
    a program initiative management tool comprising:
        a computer for managing a plurality of program initiatives;
        a list of the plurality of program initiatives including identification information related to the program initiatives and a list of tasks and subtasks that are scheduled to be performed during each program initiative, and for each task and subtask to be performed for a particular program initiative, wherein each program initiative is accomplished independently of any other program initiative wherein further, each program initiative produces a project result independent of any other project result:
        a target date of completion wherein the target date is entered in a manner to differentiate a status of the corresponding task and subtask;
    a program initiative delivery process document comprising:
        a list of business functionalities entered in a differentiated manner,
        a list of activities to be performed by the business functionalities, the activities corresponding to at least one task
        and at least one subtask in the program initiative management tool, and
        description of business functionalities that are used as one or more resources for the activities;
        a flag to indicate the availability of the resource to meet the target date of completion for the task and subtask;
        a jeopardy entered for each task for which a resource is not available when required wherein the jeopardy indicates a conflict of a resource with another task in another program initiative; and
    a relational database for storing information related to activities, resources and flags that describe the entries in the program initiative delivery process document.

2. The system recited in claim 1, wherein the program initiative management tool further comprises:
    a list of the plurality of program initiatives in rows, one program initiative per row;
    one or more columns for providing additional information for each of the program initiatives;
    a column corresponding to each task to be performed for each of the program initiatives, with a task heading corresponding to the task;
    a column corresponding to each subtask to be performed for each task, with a subtask heading corresponding to the subtask to be performed, and;
    a target completion date entered for each task and subtask for each of the plurality of program initiatives, the target completion date entered at the intersection of the column and row corresponding to the task and program initiative respectively, wherein the target completion date is entered in a manner to indicate a status of the tasks.

3. The system recited in claim 1, wherein the plurality of program initiatives is listed in priority order.

4. The system recited in claim 1, wherein the program delivery process document comprises:
    a plurality columns corresponding to one or more business functionalities, with the corresponding business unit as a heading;
    a plurality of rows corresponding to one or more functional units associated with each of the business functionalities, the functional unit listed in the column corresponding to the associated business functionality;
    a plurality of additional columns associated with the activities, listing one activity per column in one of the rows corresponding to the functional unit responsible for the activity; and
    a functional unit to be used as a resource for a particular activity are listed as such in the column corresponding to the activity.

5. The system recited in claim 1, wherein said manner to indicate the task uses color.

6. The system recited in claim 1, wherein said manner to indicate the task uses text formatting.

7. The system recited in claim 1, wherein the relational database is a web server having a web browser graphical user interface front end.

8. The system recited in claim 1, wherein tasks not having target completion dates are identified.

9. A computer implemented method for managing a plurality of program initiatives comprising the steps of:
    listing the plurality of program initiatives, in priority order, along with identification information related to the program initiatives and one or more tasks that can be performed for each program initiative, wherein each program initiative is accomplished independently of any other program initiative wherein further, each program initiative produces a project result independent of any other project result;
    entering a target completion date for each task to be performed in each program initiative in a manner to indicate a status of the corresponding task;
    entering one or more resources for each task of each program initiative required to complete the task; and
    entering a jeopardy for each task for which at least one resource is being utilized by another program initiative and is not available when required.

10. The method recited in claim 9, further comprising the steps of:

entering a list of one or more business functionalities in a differentiated manner;

providing a list of one or more activities corresponding to each of the one or more business functionalities, the one or more activities corresponding to the task and subtasks in the program initiative; and providing flag indicating the availability of business functionalities that are used as resources for the one or more activities.

11. The method recited in claim 10, further comprising the steps of:

creating a relational database for storing information related to activities, resources and flags that describe the entries related to a program initiative delivery process document.

12. The method recited in claim 9, further comprising the step of indicating the status of each task and subtask using different colors.

13. The method recited in claim 9, further comprising the step of indicating the status of each task and subtask using different text formats.

14. The method recited in claim 11, further comprising the step of creating the relational database using a server executing a web browser graphical user interface front end.

15. The method recited in claim 9, further comprising the step of identifying tasks and subtasks not having target completion dates.

16. A system for identifying one or more jeopardies in a plurality of program initiatives comprising:

a computer for managing a plurality of program initiatives;

a program initiative management tool, showing the plurality of program initiatives in a prioritized list, and for each program initiative, showing a target completion date for each task associated with each program initiative and a jeopardy for each task for which a resource is being utilized by another project initiative and is not available when required, wherein the jeopardy is shown in a manner to differentiate it from a target completion date, wherein each program initiative is accomplished independently of any other program initiative wherein further, each program initiative produces a project result independent of any other project result;

a program initiative delivery process document, providing a template for generating new program initiatives, including a list of one or more business functionalities and functional units corresponding thereto and for each functional unit an indication of which activity the functional unit serves as a resource; and a relational database for storing activities that can be performed by the functional units and associated resources.

17. The system recited in claim 16, wherein the jeopardy is shown using a different color than any target completion date.

18. The system recited in claim 16, wherein the jeopardy is shown using a different text format than any target completion date.

19. The system recited in claim 16, wherein each target completion date is assigned at least a color and a text format to indicate a status of the task with which it is associated.

20. The system recited in claim 16, wherein the program initiative management tool comprises a spreadsheet.

21. The system recited in claim 16, wherein the relational database comprises a web server and web browser graphical user interface front end.

22. A system for managing a plurality of program initiatives, comprising:

a computer for managing a plurality of program initiatives;

means for listing the program initiatives according to a pre-determined priority, wherein each program initiative is accomplished independently of any other program initiative wherein further, each program initiative produces a project result independent of any other project result;

means for assigning tasks and subtasks required to complete each program initiative;

means for entering a target completion date for each task and subtask of each program initiative in a manner to indicate a status of the task or subtask;

means for assigning one or more jeopardies to tasks that do not have a required resource available when needed;

means for showing the jeopardies in a manner to indicate which subtask of a program initiative caused the jeopardy; and means for indicating those tasks that are not required for completion of any one or more of the plurality of program initiatives.

23. The system recited in claim 22, further comprising means for showing the target completion dates and jeopardies on a spreadsheet.

24. The system recited in claim 22, wherein the means for entering the target completion date includes means for entering the target completion date using at least a color and a text format to indicate status of the task.

25. The system recited in claim 22, further comprising means for providing additional information regarding activities associated with the tasks and subtasks.

26. The system recited in claim 25, further comprising means for providing additional information regarding resources associated with the activities.

27. The system recited in claim 26, further comprising means for providing additional information regarding an input and an output associated with the activities.

28. The system recited in claim 22, further comprising means for providing a template for generating a program initiative.

\* \* \* \* \*